(12) United States Patent
Shyu

(10) Patent No.: US 6,564,659 B2
(45) Date of Patent: May 20, 2003

(54) BELT FIXING STRUCTURE OF A SCANNER

(75) Inventor: Devon Shyu, Tainan Hsien (TW)

(73) Assignee: Avision Inc., Hsin-Chu (TW)

( * ) Notice: Subject to any disclaimer, the term of this patent is extended or adjusted under 35 U.S.C. 154(b) by 0 days.

(21) Appl. No.: 09/842,102

(22) Filed: Apr. 26, 2001

(65) Prior Publication Data

US 2002/0096981 A1 Jul. 25, 2002

(30) Foreign Application Priority Data

Jan. 19, 2001 (TW) .......................... 090201140

(51) Int. Cl.[7] .............................................. F16H 27/02
(52) U.S. Cl. .................... 74/89.2; 399/211; 312/319.7; 358/497
(58) Field of Search ................................. 399/177, 211; 358/497, 474; 400/335, 320; 74/89.2, 89.21, 89.22; 414/280

(56) References Cited

U.S. PATENT DOCUMENTS 5,319,419 A * 6/1994 Ishida et al. ................ 399/208
5,804,932 A * 9/1998 Yanagisawa ................ 74/89.22
6,108,505 A * 8/2000 Hayashi ...................... 399/206
6,210,098 B1 * 4/2001 Cohn et al. ................. 74/89.21

* cited by examiner

Primary Examiner—Lanna Mai
Assistant Examiner—Jerry Anderson
(74) Attorney, Agent, or Firm—Charles E. Baxley

(57) ABSTRACT

The present invention includes a first positioning assembly and a second positioning assembly respectively mounted on the bottom housing of the scanner. The first positioning assembly defines a first clamping groove, and the second positioning assembly defines a second clamping groove. A toothed belt is used to drive the chassis of the scanner to move reciprocally. The toothed belt includes a first end and a second end respectively locked in the first clamping groove of the first positioning assembly and the second clamping groove of the second positioning assembly. The toothed belt can be mounted directly, without having to additionally perform a working process, thereby reducing the machining processes, and thereby decreasing the cost of fabrication.

6 Claims, 9 Drawing Sheets

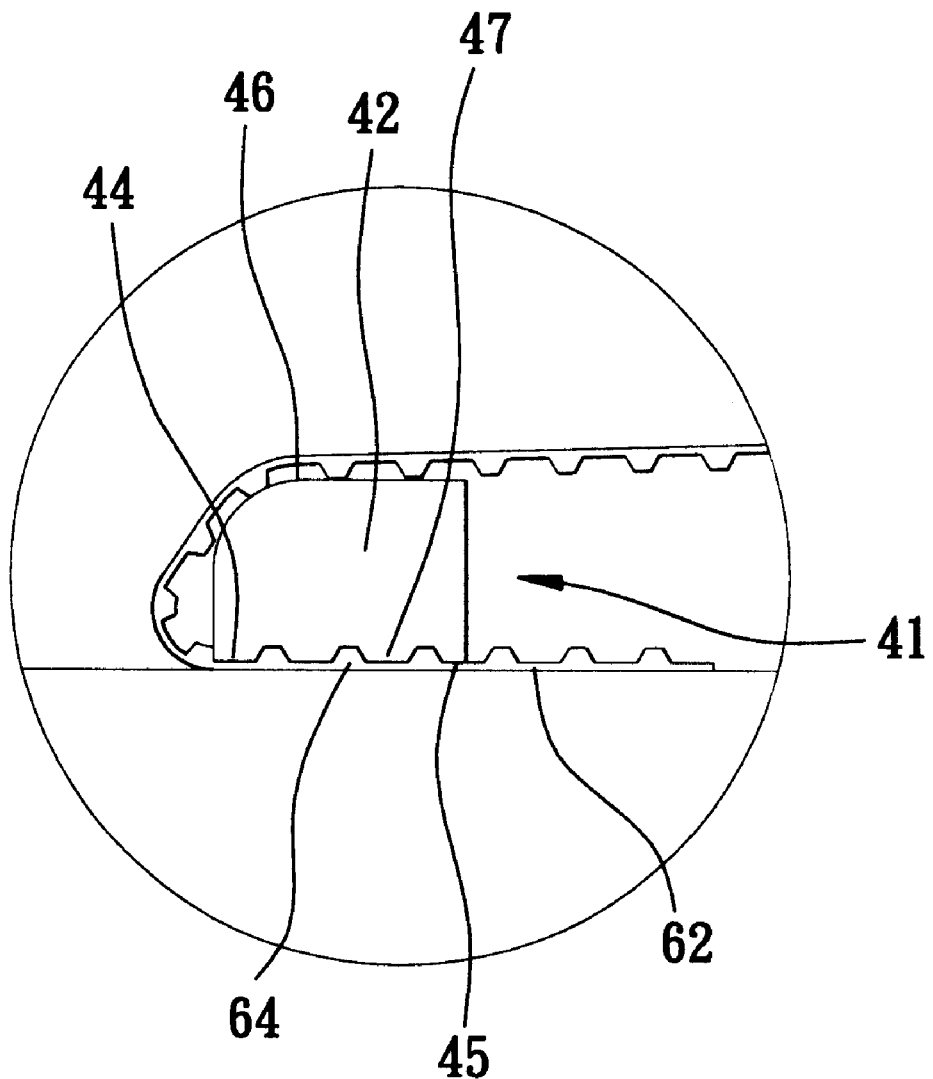
F I G. 5

BELT FIXING STRUCTURE OF A SCANNER

BACKGROUND OF THE INVENTION

1. Field of the Invention

The present invention relates to a belt fixing structure of a scanner, and more particularly to an open-type belt fixing structure that is used to drive the chassis of the scanner to move reciprocally.

2. Description of the Related Art

When the scanner is used, a belt driven by a motor is used to drive the chassis of the scanner to move reciprocally. The connection manner of the belt with the chassis includes a closed type and an open type.

The closed type indicates that each of the two ends of the belt is formed with a loop. With regard to the open type mounting, as shown in FIG. 9, one end of the belt 11 is formed with a loop 12 which has a fastening ring 13 serving as a seal. A spring 16 is hooked between the loop 12 and the first base 15 mounted on the bottom housing 14 of the scanner. The belt passes through two guide rollers 18 and 19 on the bottom face of the chassis 17, and through a rotary wheel 25. The other end of the belt 11 is also formed with a loop 21 which has a fastening ring 22 serving as a seal. A spring 24 is hooked between the loop 21 and the second base 23 mounted on the bottom housing 14 of the scanner.

In the above-mentioned open type belt fixing structure, it is apparent that, the two ends of the belt 11 have to form the loops 12 and 21 respectively, and each loop 12 and 21 has to be mounted with a fastening ring 13 and 22 to serve as a seal. Consequently, the belt needs to be worked additionally, thereby increasing the cost of fabrication.

SUMMARY Of THE INVENTION

The primary objective of the present invention is to provide an open-type belt fixing structure, wherein the belt can be fixed directly by a locking fit manner, without having to additionally perform a working process, thereby reducing the machining processes, and thereby decreasing the cost of fabrication.

For achieving the above-mentioned objective, a first positioning assembly and a second positioning assembly are respectively mounted on the bottom housing of the scanner. The first positioning assembly defines a first clamping groove, and the second positioning assembly defines a second clamping groove. The belt includes a first end and a second end respectively locked in the first clamping groove of the first positioning assembly and the second clamping groove of the second positioning assembly. The belt can be positioned rigidly by means of the locking and clamping effects between the clamping grooves and the belt.

In the clamping grooves of the first positioning assembly and the second positioning assembly, the side face of the clamping groove is formed with a plurality of locking teeth. After the locking teeth are combined with the tooth profile of the toothed belt, the belt can be locked and positioned.

The first positioning assembly includes a base located opposite to the wall face of the bottom housing of the scanner. The base is spaced from the wall face of the bottom housing with a predetermined distance, thereby forming the clamping groove. The side wall face of the base is formed with a plurality of locking teeth, or the wall face of the bottom housing is formed with a plurality of locking teeth.

The second positioning assembly includes a base that is formed with a clamping groove. The side wall face of the clamping groove is formed with a plurality of locking teeth. The clamping groove is arranged in an oblique manner.

Further benefits and advantages of the present invention will become apparent after a careful reading of the detailed description with appropriate reference to the accompanying drawings.

BRIEF DESCRIPTION OF THE DRAWINGS

FIG. 5 is a schematic view showing the first positioning assembly being assembled with the toothed belt;

DETAILED DESCRIPTION OF THE INVENTION

Figure 1:
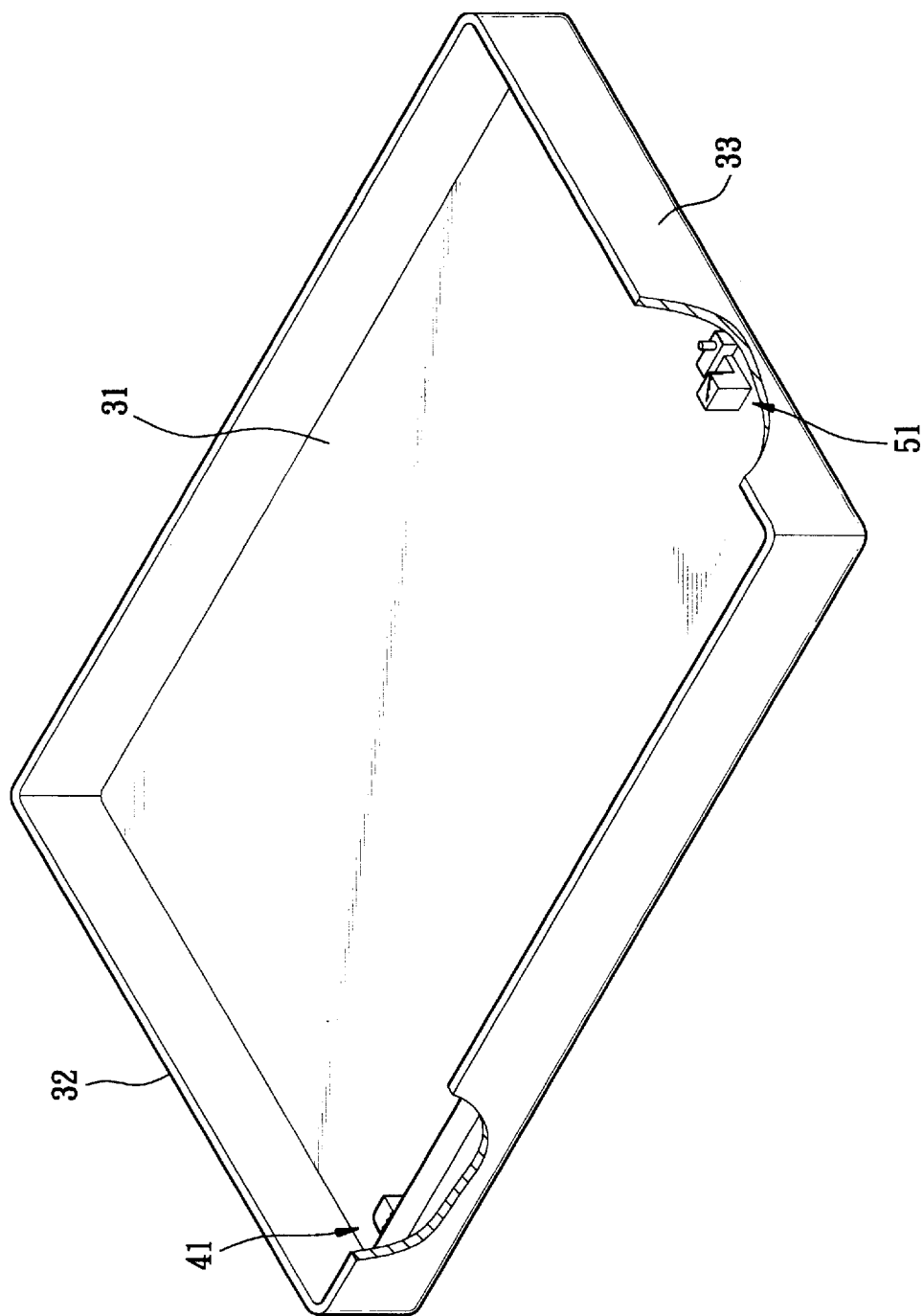
FIG. 1 is a pictorial view of a belt fixing structure of a scanner in accordance with one embodiment of the present invention.
Figure 4:
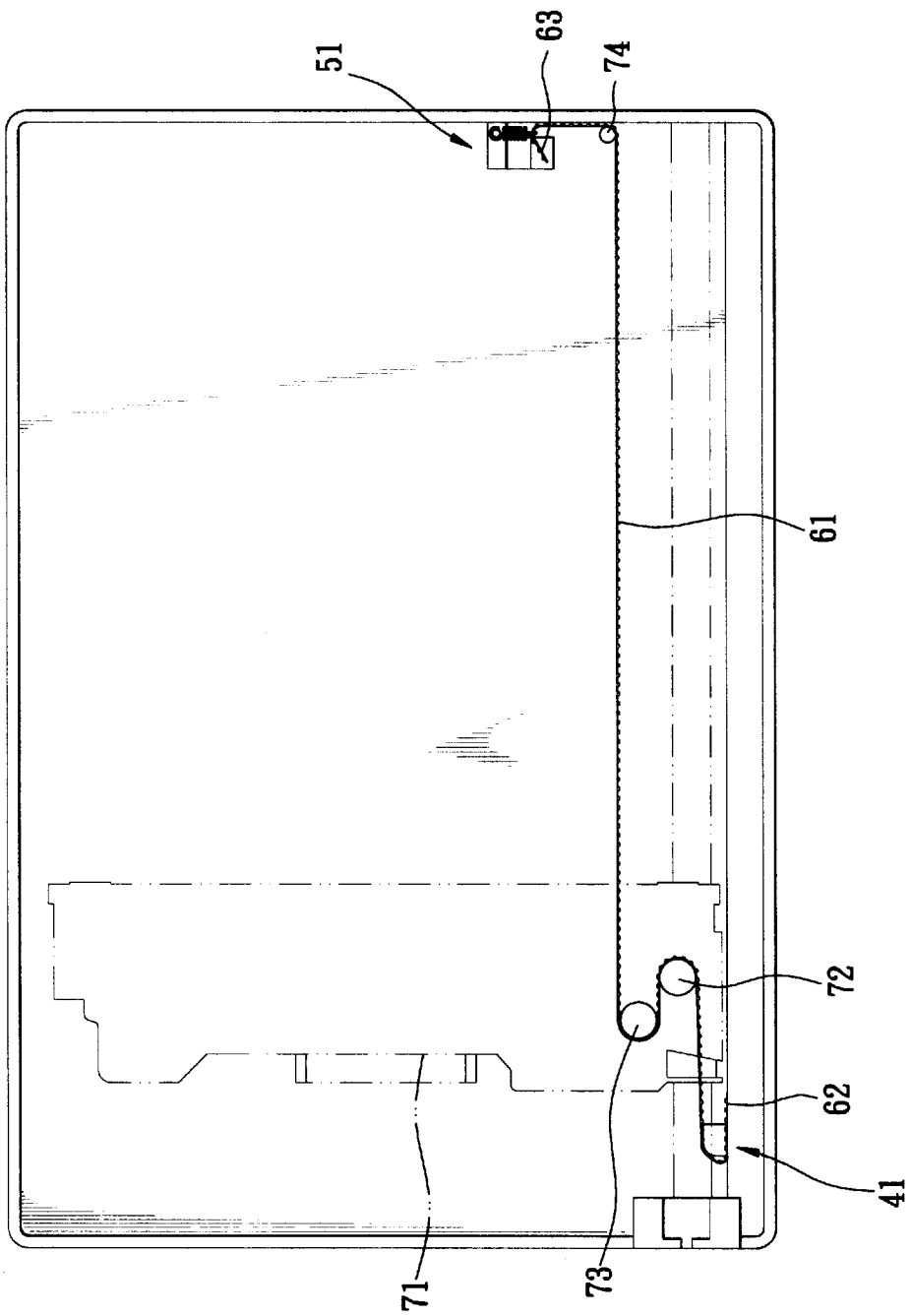
FIG. 4 is a top plan view of the belt fixing structure of a scanner as shown in FIG. 1.

Referring to the drawings and initially to FIGS. 1 and 4, in accordance with one embodiment of the present invention, the bottom housing 31 of the scanner has a first end 32 on which a first positioning assembly 41 is mounted, and a second end 33 on which a second positioning assembly 51 is mounted. A toothed belt 61 combined with the chassis 71 of the scanner has a first end 62 and a second end 63 respectively mounted on the first positioning assembly 41 and the second positioning assembly 51.

Figure 2:
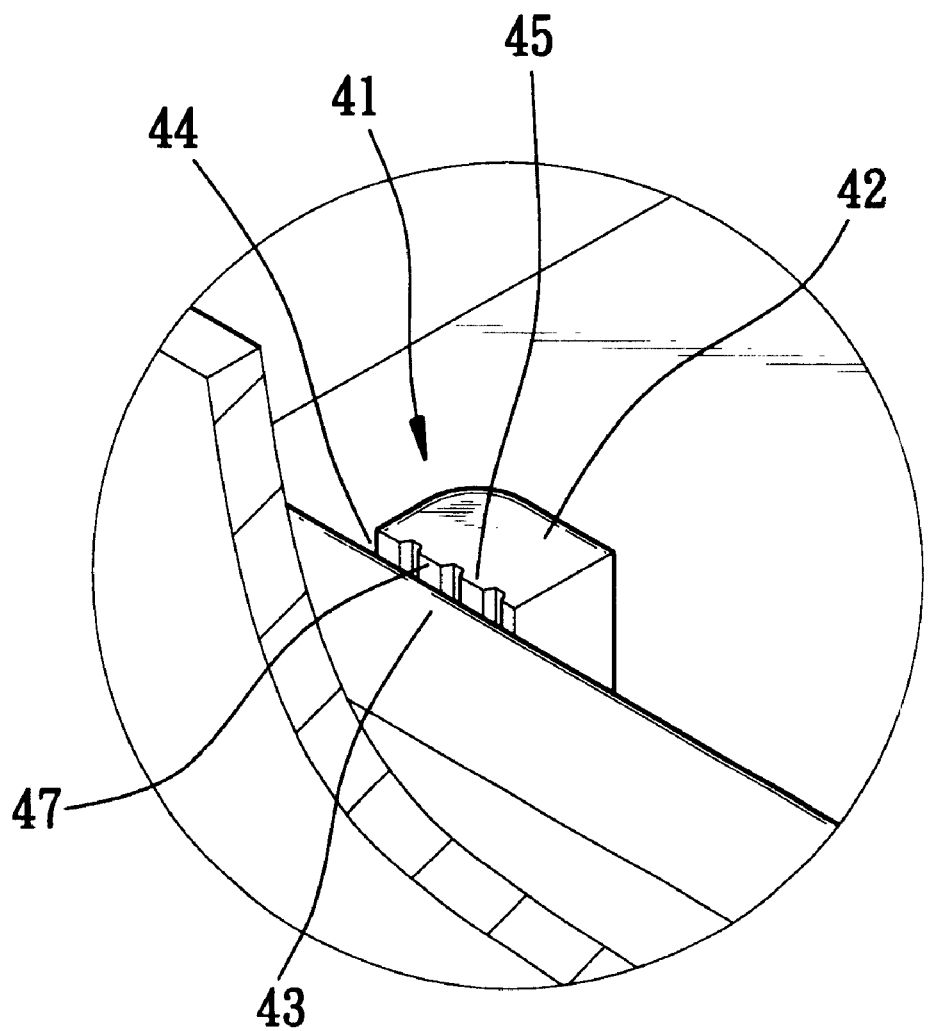
FIG. 2 is an enlarged view of a first positioning assembly of the belt fixing structure of a scanner as shown in FIG. 1.
Figure 3:
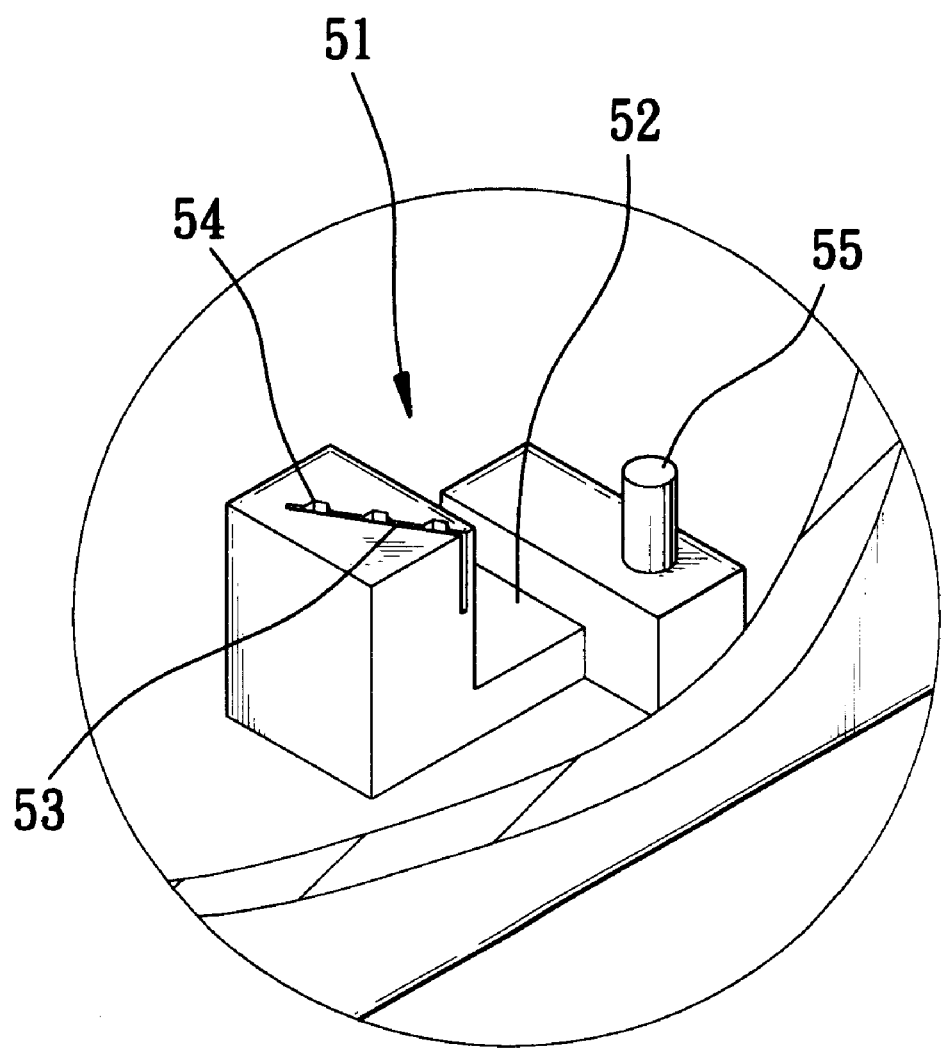
FIG. 3 is an enlarged view of a second positioning assembly of the belt fixing structure of a scanner as shown in FIG. 1.

Referring to FIGS. 1 and 2, the first positioning assembly 41 includes a base 42 opposite to the wall face 43 of the bottom housing 31. The base 42 is spaced from the wall face 43 of the bottom housing 31 with a predetermined distance, thereby forming a clamping groove 44. The first side face 45 of the base 42 is formed with a plurality of locking teeth 47. Referring to FIGS. 1 and 3, the second positioning assembly 51 includes a base 52 defining an oblique clamping groove 53. The wall face of the clamping groove 53 is formed with a plurality of locking teeth 54. The base 52 is additionally mounted with a lug 55.

Referring to FIGS. 4 and 5, the first end 62 of the toothed belt 61 is directly locked in the clamping groove 44 of the first positioning assembly 41. The tooth profile 64 of the surface of the toothed belt 61 engages the locking teeth 47 of the first side face 45 of the base 42. The toothed belt 61 passes the periphery of the base 42. Thus, the toothed belt 61 is in contact with the first side face 45 and the second side face 46 of the base 42, so that the toothed belt 61 surrounds the base 42.

The tooth profile 64 of the surface of the toothed belt 61 engages the locking teeth 47 of the first side face 45 of the base 42, and the toothed belt 61 reeves through the base 42. Thus, the first end 62 of the toothed belt 61 and the first positioning assembly 41 form a rigid combination action.

In the first positioning assembly 41, except for the base 42 being opposite to the wall face 43 of the bottom housing 31 to form the clamping groove 44, the base 42 can also be directly formed with a clamping groove 44, or the wall face 43 of the bottom housing 31 can be formed with a protruding wall block (not shown) opposite to the base 42, and a clamping groove 44 is also formed between the base 42 and the wall block.

Figure 6:
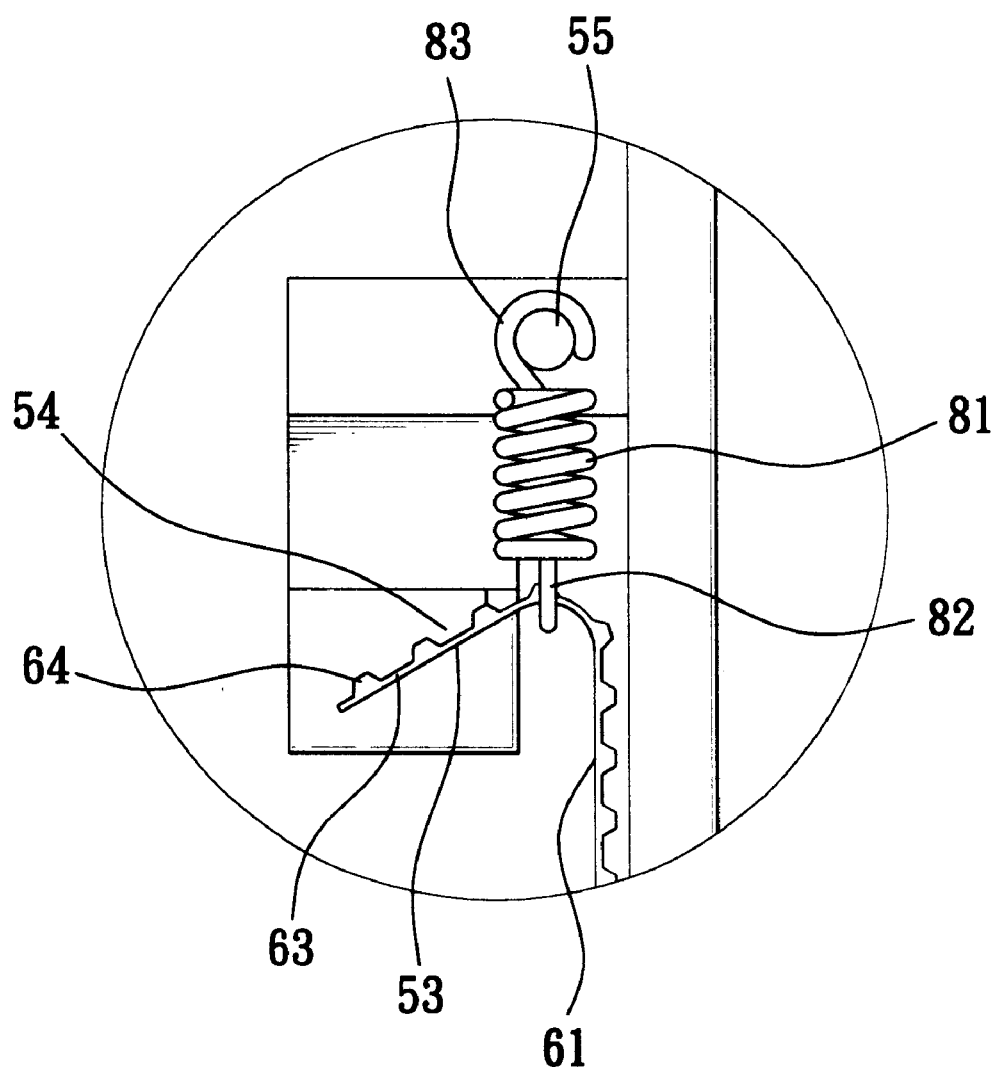
FIG. 6 is a schematic view showing the second positioning assembly being assembled with the toothed belt.

Referring to FIGS. 4 and 6, the toothed belt 61 passes through the guide rollers 72 and 73 of the chassis 71, and passes through a rotary wheel 74. Then, the second end 63 of the toothed belt 61 is directly locked in the clamping groove 53 of the base 52. The tooth profile 64 of the surface of the toothed belt 61 engages the locking teeth 54 of the wall face of the clamping groove 53. In addition, an elastic member 81 has a first end 82 hooked on the toothed belt 61 and a second end 83 hooked on the lug 55.

The second end 63 of the toothed belt 61 is turned obliquely to be locked in the clamping groove 53 of the base 52, and the tooth profile 64 of the surface of the toothed belt 61 engages the locking teeth 54 of the wall face of the clamping groove 53. Thus, the second end 63 of the toothed belt 61 is rigidly and stably combined with the second positioning assembly 51.

Therefore, the first end 62 and the second end 63 of the toothed belt 61 are rigidly combined with the first positioning assembly 41 and the second positioning assembly 51 respectively. Thus, when the toothed belt 61 is driven by a motor (not shown) to drive the chassis 71 to move reciprocally, the toothed belt 61 is able to drive the chassis 71 stably.

Figure 7:
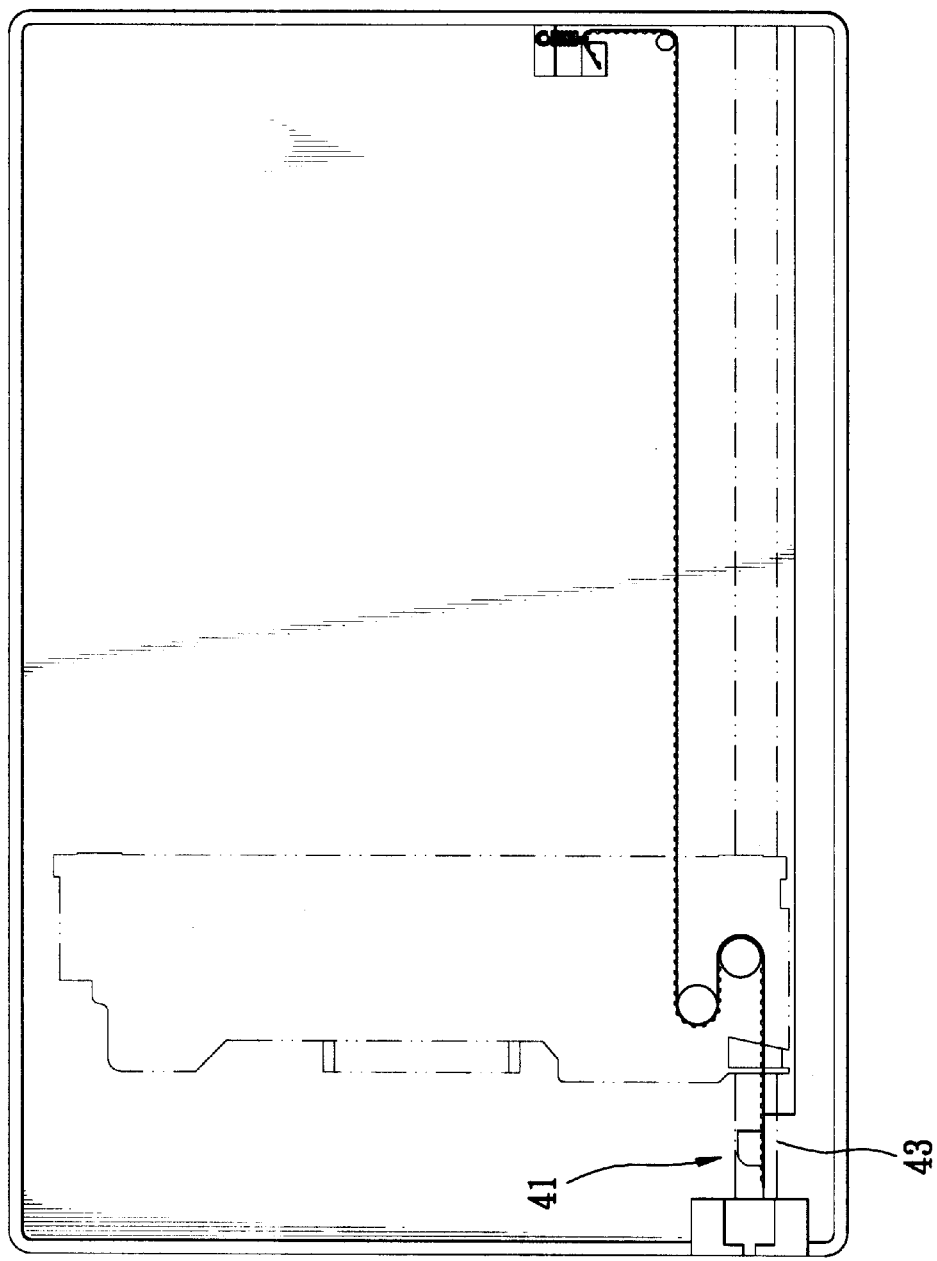
FIG. 7 is a top plan view of the belt fixing structure of a scanner in accordance with another embodiment of the present invention.
Figure 8:
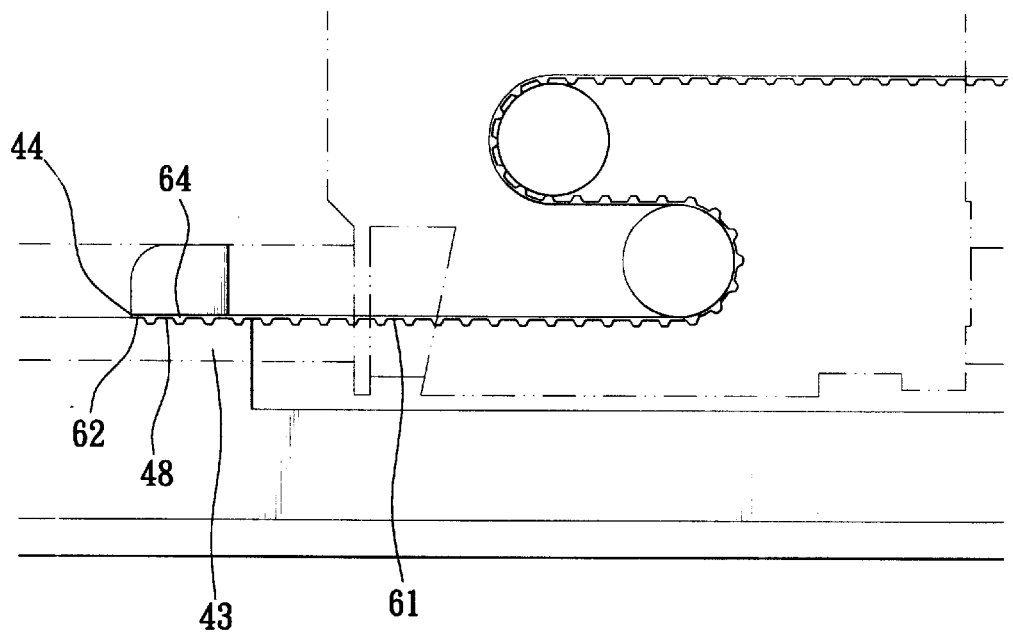
FIG. 8 is a schematic view of the belt fixing structure of a scanner in accordance with another embodiment of the present invention, wherein the first positioning assembly is assembled with the toothed belt.
Figure 9:
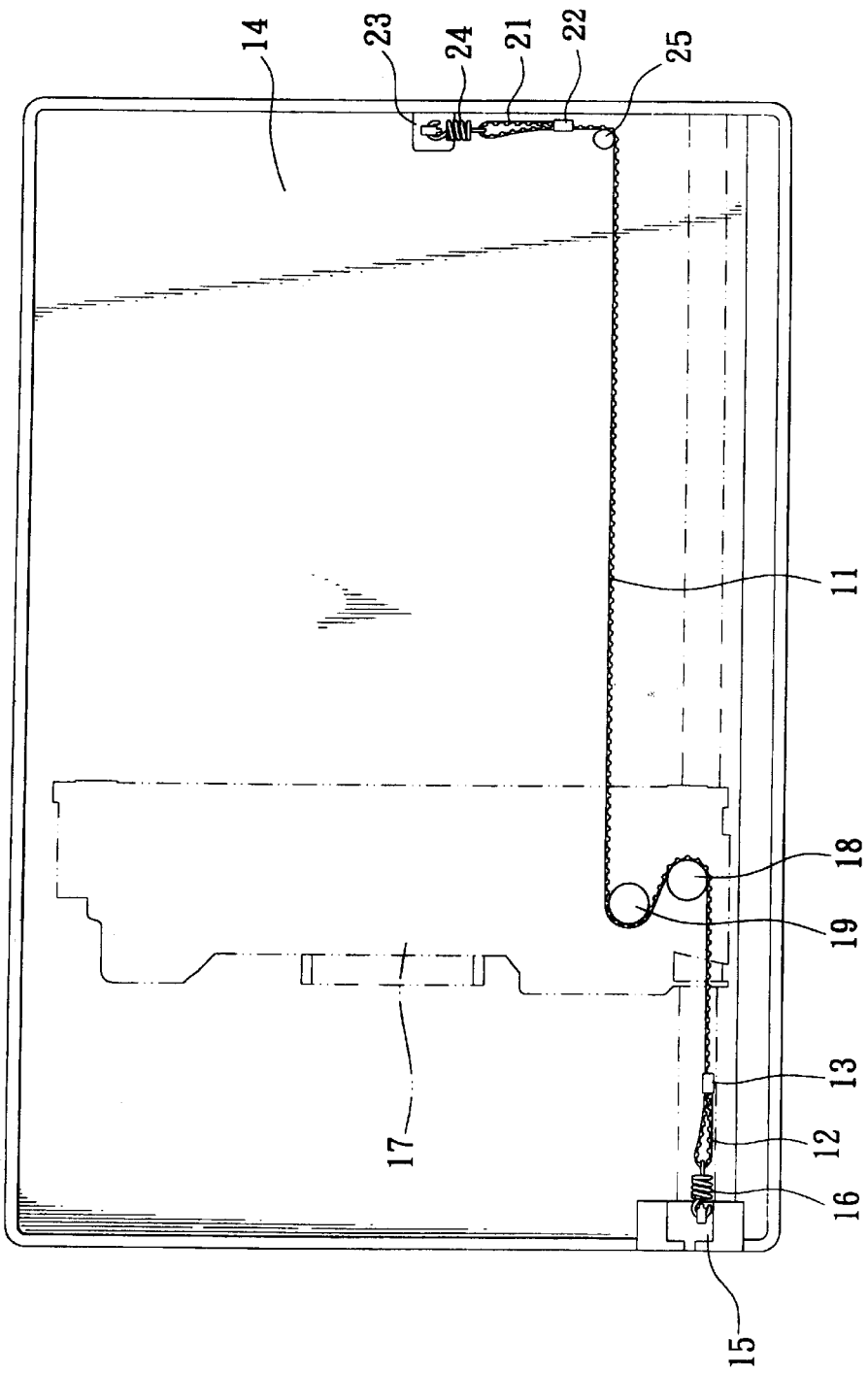
FIG. 9 is a top plan view of a conventional open type belt fixing structure in accordance with the prior art.

Referring to FIGS. 7 and 8, in accordance with another embodiment of the present invention, the wall face 43 of the bottom housing 31 of the first positioning assembly 41 is formed with a plurality of locking teeth 48. At the same time, the base is not formed with the locking teeth. When the first end 62 of the toothed belt 61 is locked in the clamping groove 44 of the first positioning assembly 41, the tooth profile 64 of the surface of the toothed belt 61 engages the locking teeth 48. Thus, the toothed belt 61 can be extended directly without having to reeve through the base 42.

The width of the clamping groove 44 can be made to be slightly smaller than the thickness of the toothed belt 61. When the toothed belt 61 is locked in the clamping groove 44, the locking teeth 48 of the wall face 43 of the bottom housing 31 engages the tooth profile 64 of the toothed belt 61, and the clamping groove 44 can clamp the first end 62 of the toothed belt 61 at the same time. Thus, the first end 62 of the toothed belt 61 can be positioned in the clamping groove 44 rigidly.

In accordance with another embodiment of the present invention (not shown), the width of the clamping groove 44 of the first positioning assembly 41 is slightly smaller than the thickness of the toothed belt 61. The side of the clamping groove 44 is flat, or forms a rough surface. Thus, when the first end 62 of the toothed belt 61 is forced into the clamping groove 44, the clamping groove 44 can clamp the first end 62 of the toothed belt 61, so that the toothed belt 61 is positioned tightly. The above-mentioned structure can also be used in the second positioning assembly 51.

In the above-mentioned embodiments of the present invention, the first end 62 and the second end 63 of the toothed belt 61 can be directly locked in the clamping groove 44 of the first positioning assembly 41 and in the clamping groove 53 of the second positioning assembly 51 respectively. By combination of the locking teeth 47, 48 and 54 with the tooth profile 64, the width of the clamping groove 44 and 53 is slightly smaller than the thickness of the toothed belt 61, thereby forming a clamping effect. The first end 62 and the second end 63 of the toothed belt 61 are turned to be locked in the clamping groove 44 and the clamping groove 53, so that the toothed belt 61 can obtain a rigid and tight positioning effect. Therefore, after the toothed belt 61 is cut, it can be mounted directly, without having to additionally perform a working process, thereby reducing the machining processes, and thereby decreasing the cost of fabrication.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A belt fixing structure of a scanner, comprising:
    a bottom housing having a first end and a second end away from the first end;
    a first positioning assembly mounted on the first end of the bottom housing and defining a first clamping groove which has a fixed side face formed with a plurality of locking teeth;
    a second positioning assembly mounted on the second end of the bottom housing and defining a second clamping groove;
    a toothed belt having a first end locked and positioned in the first clamping groove of the first positioning assembly, and a second end locked and positioned in the second clamping groove of the second positioning assembly; and
    an elastic member having a first end mounted on the second positioning assembly and a second end mounted on the toothed belt.

2. The belt fixing structure of a scanner in accordance with claim 1 wherein the base of the second positioning assembly includes a lug and the first end of the elastic member is hooked on the lug.

3. The belt fixing structure of a scanner in accordance with claim 1, wherein the first positioning assembly includes a base secured on the bottom housing and located opposite to a wall face of the bottom housing, thereby forming the first clamping groove between the base and the wall face of the bottom housing.

4. The belt fixing structure of a scanner in accordance with claim 1, wherein the second positioning assembly includes a base secured on the bottom housing and defining the second clamping groove which extends along a diagonal of the base of the second positioning assembly.

5. The belt fixing structure of a scanner in accordance with claim 3, wherein the wall face of the bottom housing is formed with a plurality of locking teeth opposite to one side face of the base.

6. The belt fixing structure of a scanner in accordance with claim 1, wherein the second clamping groove of the second positioning assembly has a wall face formed with a plurality of locking teeth.

* * * * *